(12) United States Patent
Huybrechts et al.

(10) Patent No.: US 8,822,622 B2
(45) Date of Patent: Sep. 2, 2014

(54) TWO-COMPONENT POLYURETHANE COATING COMPOSITIONS

(75) Inventors: Jozef Huybrechts, Turnhout (BE); Leen Tanghe, Kontich (BE); Richard Milic, Hradec Kralove (CZ)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 109 days.

(21) Appl. No.: 13/513,039

(22) PCT Filed: Dec. 1, 2010

(86) PCT No.: PCT/US2010/058491
§ 371 (c)(1),
(2), (4) Date: May 31, 2012

(87) PCT Pub. No.: WO2011/068826
PCT Pub. Date: Jun. 9, 2011

(65) Prior Publication Data
US 2012/0237688 A1 Sep. 20, 2012

Related U.S. Application Data

(60) Provisional application No. 61/265,435, filed on Dec. 1, 2009, provisional application No. 61/265,438, filed on Dec. 1, 2009.

(51) Int. Cl.
*C09D 175/04* (2006.01)
*B05D 3/02* (2006.01)
*C08G 18/79* (2006.01)
*C08G 18/62* (2006.01)
*C08G 18/24* (2006.01)

(52) U.S. Cl.
CPC .......... *C08G 18/6254* (2013.01); *C08G 18/792* (2013.01); *C09D 175/04* (2013.01); *C08G 18/242* (2013.01)

USPC .......................... 528/58; 524/590; 427/385.5

(58) Field of Classification Search
None
See application file for complete search history.

(56) References Cited

FOREIGN PATENT DOCUMENTS

WO    WO 9620968 A1 * 7/1996 ............. C08G 18/40
WO    WO 2007147851 A1 * 12/2007 ............. C08G 18/24

* cited by examiner

*Primary Examiner* — Vu A Nguyen
(74) *Attorney, Agent, or Firm* — Ingrassia Fisher & Lorenz, P.C.

(57) ABSTRACT

The invention is directed to coating compositions comprising
A) at least one hydroxyl-functional and optionally acid-functional binder, preferably with an acid number of 0 to 150 mg KOH/g binder solids,
B) at least one polyisocyanate curing agent with free isocyanate groups,
C) at least one thermally latent tetrahydrocarbyl tin catalyst of general formula (I)

$$R_nR'_{4-n}Sn \quad (I)$$

wherein R is an alkyl group, R' is an aryl, arylalkyl or alkenyl group and n is 1, 2 or 3, and
D) optionally at least one acid-functional compound, that is different from component A),
with the proviso that the acid number of a composition, consisting of the at least one binder A) and optionally of the at least one acid-functional compound D), has an acid number of at least 5 mg KOH/g solids, preferably of least 10 mg KOH/g solids, and to a process for coating substrates comprising the steps:
I) applying the coating composition to an optionally pre-coated substrate, and
II) curing the applied coating composition by means of thermal energy.

16 Claims, No Drawings

TWO-COMPONENT POLYURETHANE COATING COMPOSITIONS

CROSS-REFERENCE TO RELATED APPLICATIONS

This is a 371 of International Application No. PCT/US2010/058491, filed Dec. 1, 2010, which was published under PCT Article 21(2), and which claims priority from US Provisional Application No. 61/265,435, filed Dec. 1, 2009, and US Provisional Application No. 61/265,438 filed Dec. 1, 2009.

FIELD OF THE INVENTION

The present invention relates to two-component coating compositions with improved pot-life comprising hydroxyl-functional binders and polyisocyanate curing agents. The invention further relates to a process for coating substrates by using the two-component coating compositions.

DESCRIPTION OF RELATED ART

Two-component polyurethane coating compositions are well-known in the art. In particular low VOC (VOC=volatile organic compound) two-component polyurethane coating compositions suffer from the problem that improved productivity, i.e. fast drying and cross-linking, results in short pot-life and often poor appearance. One of the approaches to solve this problem was to use a latent catalyst for the hydroxyl/isocyanate reaction that is chemically activated during film formation.

For example, in EP 1 354 903 tetrahydrocarbyl tin compounds are disclosed, which can be used as catalysts, for example for synthesis of polyurethane elastomers and foams by the reaction of isocyanates with polyols. The catalysts are substantially catalytically ineffective at room temperature and containing hydrocarbyl groups R, for example, alkyl groups, that are substantially inert under usual conditions of storage and use, and hydrocarbyl groups R', for example, aryl, aralkyl or alkenyl groups, that are more reactive than R under conditions of use.

Also, an actinic radiation-curable coating composition is known from WO 2007/147851. In this document the addition of a photo-latent catalyst to a two-component hydroxyl/isocyanate curing system is described. The photo-latent catalyst is an organic metal compound comprising a latent catalytically active metal, wherein the latent catalytically active metal has no bonds to other metal atoms. Before radiating with actinic radiation the photo-latent catalyst has substantially no catalytic activity for the isocyanate/hydroxyl reaction. Activation of the catalyst occurs by radiating with UV radiation. However, additional UV lamp equipment is required for this purpose and a sensitizer must be used in addition to the photolatent catalyst.

Furthermore, U.S. Pat. No. 6,472,493 discloses two-component coating compositions based on hydroxyl functional binders and polyisocyanate hardeners and a specific curing catalyst system. The catalyst system comprises metal catalysts, specifically organotin carboxylates, e.g. dialkyl tin carboxylates of aliphatic carboxylic acids such as dibutyl tin dilaurate (DBTL), in combination with a tertiary amine and an organic acid. The organic acid is included to increase the pot life of the coating composition.

WO 2007/020270 describes coating compositions based on hydroxyl functional binders and polyisocyanate hardeners, comprising metal catalysts for the hydroxyl/isocyanate reaction, specifically organotin carboxylates, e.g. dialkyl tin carboxylates of aliphatic carboxylic acids, such as dibutyl tin dilaurate (DBTL), in combination with a carboxylic acid, wherein the carbonyl group is in conjugation with a π-electron system.

The prior art technologies disclosed above still suffer from the problem that the pot life is to short or the drying properties are not satisfactory. Also, the resultant coatings need improvements in appearance and hardness.

Therefore, the objective of the present invention was to provide low VOC two-component coating compositions based on hydroxyl-functional binders and polyisocyanate curing agents that have excellent drying performance and sufficient pot life. Furthermore, the coatings obtained should have a very good hardness and appearance. The coating compositions shall have a high solids content and respectively a low VOC value, of for example 3.5 lbs/gal (420 g/l or less.

SUMMARY OF THE INVENTION

The invention is directed to coating compositions comprising

A) at least one hydroxyl-functional and optionally acid-functional binder, preferably with an acid number of 0 to 150 mg KOH/g binder solids, B) at least one polyisocyanate curing agent with free isocyanate groups, C) at least one thermally latent tetrahydrocarbyl tin catalyst of general formula (I)

$$R_nR'_{4-n}Sn \qquad (I)$$

wherein R is an alkyl or cycloalkyl group, R' is an aryl, arylalkyl or alkenyl group and n is 1, 2 or 3, and D) optionally at least one acid-functional compound, that is different from component A), with the proviso that the acid number of a composition, consisting of the at least one binder A) and optionally of the at least one acid-functional compound D), has an acid number of at least 5 mg KOH/g solids, preferably of at least 10 mg KOH/g solids.

Preferably the coating composition of the present invention is free of sensitizers and photo-initiators.

It has been found that according to the present invention coating compositions can be formulated that have a very good balance of sufficient pot-life and excellent overall drying performance. It was surprising and not obvious that due to the acid functionality of the binder A) and/or due to the addition of the separate acid-functional compound D) drying performance of the coating composition and hardness of the coating could remarkably be improved compared with compositions of prior art. According to prior art organic or inorganic acids have been added to two-component coating compositions based on hydroxyl and isocyanate components in order to extend pot-life.

DETAILED DESCRIPTION OF THE INVENTION

Hereafter the invention is described in more detail.

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-cross-linked polystyrene as the immobile phase, tetrahydrofuran as the liquid phase, polystyrene standards).

The coating compositions according to the invention are liquid coating compositions comprising binders, curing agents and a liquid carrier. The liquid carrier may be water and/or one or more organic solvents. Therefore, the coating compositions may be water-based or organic solvent-based.

Water-based coating compositions are coating compositions, wherein water is used as solvent or thinner when preparing and/or applying the coating composition. Usually, aqueous coating, compositions contain 20 to 80% by weight of water, based on the total amount of the coating composition and optionally, up to 15% by weight, preferably, below 10% by weight of organic solvents, based on the total amount of the coating composition.

Organic solvent-based coating compositions are coating compositions, wherein organic solvents are used as solvent or thinner when preparing and/or applying the coating composition. Usually, organic solvent-based coating compositions contain 20 to 80% by weight of organic solvents, based on the total amount of the coating composition.

The solids content of the coating composition as used in the present invention has been determined by drying a sample at 135° C. for 1 hour in an aluminum dish with 5 cm diameter.

The acid number as used in the present invention has been determined by titration according to EN ISO 2114. The acid number of binder A) is based on the binder solids of binder A). The acid number of the composition consisting of binder A) and acid-functional compound D) is based on the sum of binder solids of binder A and the solids of the acid-functional compound D), whereas a 100% organic or inorganic acid is considered as having 100% solids.

The pot life is the time within which, once the mutually reactive components of a coating composition have been mixed, the coating composition may still be properly processed or applied and coatings of unimpaired quality can be achieved. Or with other words the pot life is defined as the time that a two-component binder system after mixing the two components retains a viscosity low enough to be used in processing and that allows preparing coatings of unimpaired quality. The pot life may be, for example, in the range of from 10 minutes to 6 hours.

The coating composition of the present invention will first of all be explained in greater detail.

The coating composition comprises a "two-component" coating composition, i.e. the components which are reactive towards one another, namely the component comprising hydroxyl groups (A) and the polyisocyanate component (B), must be stored separately from one another prior to application in order to avoid a premature reaction. Generally binder component A) and polyisocyanate component B) may only be mixed together shortly before application. The term "shortly before application" is well-known to a person skilled in the art. The time period within which the ready-to-use coating composition may be prepared prior to the actual use/application depends, e.g., on the pot life of the coating composition.

The coating composition of the present invention comprises the at least one hydroxyl-functional and optionally acid-functional binder A), for example, with an acid number of 0 to 150 mg KOH/g binder solids. Preferably the binder A) has an acid number of 5 to 80, more preferred of 10 to 60 mg KOH/g binder solids. In case of water-based coating compositions binders A) preferably have an acid number of 15 to 60 mg KOH/g binder solids. In case of organic solvent-based coating compositions binders A) preferably have an acid number of 5-60 mg KOH/g binder solids.

The at least one hydroxyl and optionally acid functional binder A) may have a hydroxyl number of 40-400 mg KOH/g binder solids, preferably of 80-200 mg KOH/g binder solids.

The coating composition of the present invention preferably comprises 10-80% by weight solids, preferably 50-70% by weight solids of the at least one hydroxyl-functional binder (component A) and 5-70% by weight solids, preferably 20-40% by weight solids of the at least one curing agent with free isocyanate groups (component B), wherein the % by weight of components A) and B) are based upon the total coating composition.

Component A) of the coating composition according to the invention comprises binders with hydroxyl and optionally with acid groups. If acid groups are present, the binders preferably contain carboxyl groups. The binders are oligomeric and/or polymeric compounds with a number average molar mass (Mn) of, e.g., 500 to 500,000 g/mole, preferably of 1100 to 300,000 g/mole.

The binders A) are for example the polyurethanes, (meth)acrylic copolymers, polyesters and polyethers, known from polyurethane chemistry to the skilled person, which are used in the formulation of organic solvent-based or water-based coating compositions. They may each be used individually or in combination with one another.

Examples of polyurethane resins are those, for example, with a number average molar mass Mn of 500 to 500 000 g/mole, preferably, of 1100 to 300 000 g/mole, most preferred, of 5000 to 300 000 g/mole, a hydroxyl number of 40 to 400 mg KOH/g resin solids, preferably, of 80 to 250 mg KOH/g resin solids. Appropriate polyurethane resins which may be used are, for example, prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably, polyester polyols, polyether polyols and/or polycarbonate polyols with a molecular weight of, for example, 500-6000 g/mole. Polyols of low molar mass with a molar mass of 60-400 g/mole can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate. In order to introduce acid groups the polyurethane resins are modified with acid groups, in particular with carboxyl groups. Carboxyl groups can be introduced by way of compounds having at least one group reactive with respect to isocyanate groups and at least one carboxyl group. Preferred compounds of this type are dihydroxycarboxylic acids, with particular preference for dimethylolpropionic acid.

The thus obtained polyurethane resins can still be subjected to chain extension to increase the molecular weight. For example, NCO-functional polyurethane pre-polymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane pre-polymers can be chain extended for example with polyisocyanates The polyurethane resins include such resins which are in modified form, for example, as silicon-modified or (meth) acrylated polyurethane resins.

Examples of poly(meth)acrylate resins include all poly (meth)acrylate resins which are suited for organic solvent-based coating compositions and known to a skilled person. For example, they can be those with a number average molar mass Mn of 1000-20000 g/mole, preferably, of 1100-15000 g/mole, a hydroxyl number of 40-400 mg KOH/g resin solids, preferably, of 60-200 mg KOH/g resin solids. The poly(meth) acrylate resins can also have been prepared in the presence of different binders, e.g., in the presence of oligomeric or polymeric polyester and/or polyurethane resins.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups are hydroxyl groups and may be, for example, urea, carboxyl, sulfonic acid, silane, amine, amide, acetoacetate or epoxy groups. It would be clear that only those functional groups can be combined in the poly(meth) acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. The hydroxyalkyl residues may contain, for example, 2-10 C atoms, preferably, 2-6 C atoms. Examples of suitable hydroxyalkyl esters of alpha, beta-olefinically unsaturated monocarboxylic acids with primary hydroxyl groups are hydroxyethyl (meth)acrylate, hydroxypropyl (meth)acrylate, hydroxybutyl (meth) acrylate, hydroxyamyl (meth)acrylate, hydroxyhexyl (meth) acrylate. Examples of suitable hydroxyalkyl esters with secondary hydroxyl groups are 2-hydroxypropyl (meth)acrylate, 2-hydroxybutyl (meth)acrylate and 3-hydroxybutyl (meth)acrylate. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Unsaturated monomers which, apart from at least one olefinic double bond, contain no further functional groups are, for example, aliphatic esters of olefinically unsaturated carboxylic acids, vinyl ester and/or vinylaromatic hydrocarbons.

Examples of polyester resins which can be used as binder component A) include all polyester resins which are suited for solvent-based coating compositions, for example, hydroxy-functional polyesters with a number average molar mass of 500-10,000 g/mole, preferably, of 1100-8000 g/mole, a hydroxyl number of 40-400 mg KOH/g resin solids, preferably, of 50-200 mg KOH/g resin solids. The polyesters may be saturated or unsaturated and they may optionally be modified with fatty acids. The polyesters are produced using known processes with elimination of water from polycarboxylic acids and polyalcohols.

In order to ensure sufficient water dilutability of the binders A) in case of water-based coating compositions, these binders are modified in a suitable manner to render them hydrophilic. The binders A) may be ionically (anionically and/or cationically) and/or non-ionically modified. An anionic modification and an anionic modification in combination with a non-ionic modification is preferred. Preferably water-dilutable binders A) may contain carboxylic add groups, sulfonic and/or phosphonic acid groups. Carboxylic acid groups are most preferred. Also, emulsifiers can be used, alone or in addition to a hydrophilic modification of the binders A).

The use of hydroxyl-functional (meth)acrylate copolymers in the coating composition is preferred.

The preferred hydroxyl-functional (meth)acrylate copolymers may be used in combination with other hydroxyl-functional resins. The (meth)acrylate resins may advantageously be used in combination with at least one hydroxyl-functional polyester oligomer. Preferred polyester oligomers are hydroxyl-functionel, preferred hydroxyl-terminated, and have a weight average molar mass (Mw) not exceeding 3,000, preferably of 200-2,000 g/mole, and a polydispersity of less than 1.7. Useful oligomers include caprolactone oligomers containing terminal hydroxyl groups which may be prepared by initiating the polymerization of caprolactone with a cyclic polyol, particularly a cycloaliphatic polyol, in the presence of a tin catalysts via conventional solution polymerization techniques. Such caprolactone oligomers are well known and described at length U.S. Pat. No. 5,354,797.

Other useful polyester oligomers include alkylene oxide polyester oligomers containing terminal hydroxyl groups which may be made by reacting stoichiometric amounts of a cycloaliphatic monomeric anhydride with a linear or branched polyol in solution at elevated temperatures in the presence of a tin catalyst using standard techniques and then capping the acid oligomers so formed with monofunctional epoxies, particularly alkylene oxides. Cycloaliphatic anhydride monomers such as hexahydrophthalic anhydride and methyl hexahydrophthalic anhydride are typically employed in the alkylene oxide oligomers above. Aliphatic or aromatic anhydrides, such as succinic anhydride or phthalic anhydride may also be used in conjunction with the anhydrides described above. Typically useful linear or branched polyols include, hexanediol, 1,4-cyclohexane dimethanol, trimethylol propane, and pentaerythritol. Useful monofunctional epoxies include alkylene oxides of 2 to 12 carbon atoms. Ethylene, propylene and butylene oxides are preferred although ethylene oxide is most preferred. Other epoxies, such as. Cardura® CE5 or Cardura® CE10 glycidyl ether may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

Furthermore suitable oligomeric polyesters can be prepared using a monoepoxyester and preferably a monoepoxyester of a branched polycarboxylic acid, such as a tertiary fatty acid, like Cardura® CE10 (monoepoxyester of versatic acid) or Cardura® CE5 (monoepoxyester of pivalic acid). Those oligomeric polyesters can be synthesized by various routes, but preferably by employing a ring-opening polycondensation reaction in which a multi-functional polyol (preferably two to four-functional) or a blend of those polyols, so that the average functionality is at least two, are reacted with an anhydride and/or acid anhydride and further with a sufficient amount of the monoepoxyester to convert the acid groups into hydroxyl groups.

Suitable polyols for the above-mentioned synthesis are glycerine, trimethylolpropane, pentaerythritol, neopentyl glycol, ethyleneglycol, and the like. Suitable anhydrides for the above-mentioned synthesis include succinic anhydride, maleic anhydride, phthalic anhydride, hexahydrophthalic anhydride, methylhexahydrophthalic anhydride, and the like.

Suitable acid-anhydrides for the above-mentioned synthesis are trimellitic anhydride, hydrogenated trimellitic anhydride, the Diels-Alder adduct of maleic anhydride with sorbic acid, the hydrogenated Diels-Alder adduct of maleic anhydride and sorbic acid, and the like.

Suitable monoepoxyesters which can be used for the above-mentioned synthesis are the epoxyesters of benzoic acid, acetic acid, privalic acid (Cardura CE5), versatic acid (Cardura CE10), isobutyric acid (Cardura CE4).

Compatible blends of any of the aforementioned oligomers can be used as well in the hydroxyl component A).

Component A) may comprise 10-100, preferably 30-70% by weight of at least one hydroxyl and optionally carboxyl functional (meth)acrylate copolymer and 0-90, preferably 30-70% by weight of at least one hydroxyl functional polyester oligomer as described above. Useful combinations of hydroxyl-functional (meth)acrylic copolymers and hydroxyl-functional polyester oligomers are disclosed, for example, in EP 801 661 and U.S. Pat. No. 6,472,493.

The coating compositions can also contain low molecular reactive components, so-called reactive thinners, which are able to react with the cross-linking components. Examples of these are hydroxyl or amino-functional reactive thinners.

The coating compositions, according to the invention contain polyisocyanates with free isocyanate groups (component B) as curing agents. Examples of the polyisocyanates are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-pentamethyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or mixed.

The polyisocyanate cross-linking agents are those commonly used in the paint industry, and are described in detail in the literature and are also obtainable commercially.

The isocyanate groups of polyisocyanate cross-linking agent B) may be partially blocked. Low molecular weight compounds containing active hydrogen for blocking NCO groups are known. Examples of these are aliphatic or cycloaliphatic alcohols, dialkylaminoalcohols, oximes, lactams, imides, hydroxyalkyl esters, esters of malonic or acetoacetic acid.

According to the invention at least one thermally latent unsymmetrically substituted tetrahydrocarbyl tin catalyst of general formula (I) Sn is used (component C). N can be 1, 2 or 3. Most preferred n is 2. Individual residues R and individual residues R' can be the same or different. Preferably individual residues R are the same and individual residues R' are the same.

Most preferred n is 2 and the two residues R are the same and the two residues R' are the same.

R can be a linear or branched alkyl group or a cycloalkyl group. The alkyl group or cycloalkyl group may be substituted. Preferably R is an n-alkyl group. Also preferred R is a C1-C12 alkyl group, and especially a C1-C12 n-alkyl group. Most preferred R is a C4-C12 n-alkyl group. Examples of possible alkyl groups are methyl, ethyl, propyl, butyl, pentyl, hexyl, heptyl, octyl, nonyl, decyl, undecyl and dodecyl groups.

R' is an substituted or unsubstituted aryl, arylalkyl or alkenyl group. Examples of groups R' are phenyl, substituted phenyl, benzyl, substituted benzyl, vinyl and allyl groups.

The phenyl or benzyl groups may be substituted with alkyl or cycloalkyl groups. They may also contain heteroatoms, for example, oxygen, sulphur, halogen, phosphorus and nitrogen. Examples of possible substituents are methyl, ethyl, cyclohexyl groups, methylether, ethylether, dimethylamino, diethylamino and thioether groups.

Phenyl and benzyl groups are preferred. Preferred examples of catalysts C) are dibutyl dibenzyl tin, dibutyl diphenyl tin, dibutyl diallyl tin, dibutyl divinyl tin. Most preferred is dibutyl dibenzyl tin.

The activation of the thermally latent catalyst C) requires activation temperatures of, for example, at least 30° C. The activation temperature may be in the range of from 30 to 100° C. The amount of the catalyst C) employed in the coating composition can vary considerable depending e.g. on the specific binder system, on the specific type of catalyst and on the desired balance of pot life and curing speed. Generally 50-20,000 ppm, based on the solids content (non-volatile content) of the coating composition, can be used.

The coating composition of the present invention optionally contains the acid functional compound D). The acid functional compound D) may be a low-molecular monomeric acid-functional compound and/or an oligomeric or polymeric acid-functional compound or binder, that is different from binder A). The acid-functional binder of component D) can be any binder useful in coating compositions, which is compatible with the binder system as well as with the other ingredients of the coating composition of the present invention. In particular it can be a carboxyl-functional binder that type of binder is different from binder A). Most preferred the acid functional compound D) is a low-molecular monomeric acid-functional compound, e.g. an organic or inorganic acid. Preferably carboxylic acids are used as component D).

Carboxylic acids may be mono- or polycarboxylic acids, such as di- or tricarboxylic acids. Examples of carboxylic acids are aromatic or aliphatic carboxylic acids having 1 to 36 carbon atoms in the molecule, preferably aliphatic carboxylic acids having 1-12 carbon atoms in the molecule, such as formic acid, acetic acid, propionic acid, butanoic acid, hexanoic acid, isononanoic acid and benzoic acid. More preferred are aliphatic carboxylic acids having 1 to 10 carbon atoms in the molecule.

According to the present invention an acid number of a composition consisting of the at least one binder A) and optionally of the at least one acid-functional compound D) of at least 5 mg KOH/g solids, preferably of least 10 mg KOH/g solids, is required. The acid number of said composition is based on the sum of binder solids of binder A) and the solids of acid-functional compound D). 100% organic and inorganic acids are considered as having 100% solids. The acid number of the composition may be in the range of from 5 to 80, preferably from 10 to 70 and more preferred from 15 to 60 mg KOH/g solids.

According to a first embodiment the required acid number of the composition consisting of the at least one binder A) and optionally of the at least one acid-functional compound D) is based solely on the acid functionality of the at least one binder A). In this first embodiment no acid-functional compound D) is added. Binder A) has an acid number of at least 5 mg KOH/g binder solids, e.g., may have an acid number of 5 to 60 mg KOH/g binder solids, preferably of 10 to 60 mg KOH/g binder solids. Most preferred the acid functional groups of binder A) are carboxyl groups.

According to a second embodiment the required acid number as defined above is based substantially on the acid functionality of the at least one acid-functional compound D). In this second embodiment binder A) has substantially no acid functionality, i.e. has an acid number of <5 mg KOH/g binder solids. Preferably component D) is an organic or inorganic acid, more preferred a carboxylic acid. Suitable carboxylic acids are aromatic or aliphatic carboxylic acids having 1 to 36 carbon atoms in the molecule, preferably aliphatic carboxylic acids having 1-12 carbon atoms in the molecule, such as formic acid, acetic acid, propionic acid, butanoic acid, hexanoic acid, isononanoic acid and benzoic acid. More preferred are aliphatic carboxylic acids having 1-12 carbon atoms in the molecule.

According to a third embodiment the required acid number as defined above is based on the acid functionality of the at least one binder A) and on the acid functionality of the at least one acid-functional component D). Binder A) has an acid number of at least 5 mg KOH/g binder solids, e.g., may have an acid number of 5 to 60 mg KOH/g binder solids, preferably of 10 to 60 mg KOH/g binder solids. Most preferred the acid functional groups of binder A) are carboxyl groups. Preferably acid functional component D) is an organic or inorganic acid, more preferred a carboxylic acid. Suitable and preferred carboxylic acids are those as described already above for the second embodiment.

The acid functional component D), in particular the carboxylic acid D) can be present in the coating composition in the range of from 0.05 to 2.5% by weight, preferably in the range of from 0.08 to 2.0% by weight, based upon the solids of binder A). The acid number of the acid-functional binder A) and the acid number or amount of the acid-functional compound D) has to be selected such, that the required acid number of the composition consisting of the binder A) and optionally of component D) results in each of the three embodiments. When the component A) is a mixture of two or more binders the required acid number is based on the binder solids of the total binder mixture. Optionally the coating composition of the present invention may contain other acid-functional constituents, e.g. acid-functional additives. Those additives also contribute to the acid-functional compound D).

Preferred coating compositions comprise at least one hydroxyl-functional binder A) with an acid number of 5 to 60 mg KOH/g binder solids and at least one carboxylic acid as component D).

Optionally the coating composition of the present invention may contain at least one tertiary amine as co-catalyst. Typically useful tertiary amines include tertiary aliphatic monoamines or diamines, particularly trialkylene diamines, such as triethylene diamine, N-alkyl trimethylenediamine and trialkylamines, such as tridodecylamine, trihexadecylamine, N,N'dimethylalkyl amine, such as N,N'-dimethyldodecyl amine. The alkyl or alkylene portions of these amines may be linear or branched and may contain 1-20 carbon atoms. Another suitable amine is 1,4-diazobicyclo(2.2.2)octane (DABCO). Generally 0.05 to 0.5% by weight of the tertiary amine, based on total solids of the coating composition, can be used.

The tin catalyst C) to be used according to the present invention is a thermally latent catalyst. At ambient temperature the thermally latent catalyst has no or only a very low catalytic activity for the addition reaction of isocyanate with hydroxyl groups. When providing thermal energy to the applied coating the catalyst becomes activated and curing is enhanced by the active catalyst. Thermal energy may be provided during usual thermal curing of the curable coating composition. A minimum curing temperature of, for example, 30° C. is desired, i.e. a temperature of, for example, 30° C. is desired on the surface of the coated substrate to activate the catalyst in the applied coating. Thermal energy can be supplied by usual means well-known in coatings industry, for example, in an oven or by irradiating with IR radiation.

Surprisingly it has been found that catalyst C) can be thermally activated and that its use leads to improved pot-life. Radiating with UV radiation is not required, i.e. additional UV curing equipment is not necessary. Also, it is not necessary to add photo-initiators and sensitizers as they are typically used in UV-curable coating compositions. Also surprising was that due to the acid-functionality of binder A) and/or the separate acid functional compound D) curing can be accelerated and curing times can be remarkably reduced despite of prolonged pot-life. It can be assumed that the acid groups of the acid-functional binder A) and/or of the separate acid functional compound D) further activate the thermally latent catalyst. Without incorporating the acid functionalities as defined above drying times are to long and hardness development is insufficient.

The binders with hydroxyl groups A) and the polyisocyanate cross-linking agents B) are used in such proportion that the equivalent ratio of hydroxyl groups of binders A) to the isocyanate groups of cross-linking agents B) can be 5:1 to 1:5, for example, preferably, 3:1 to 1:3, and in particular, preferably, 1.5:1 to 1:1.5. If reactive thinners are used, their reactive functions should be taken into account when calculating the equivalent ratio.

The coating compositions, according to the invention, contain furthermore water and/or organic solvents. Water-based coating compositions contain, for example, 30-60% by weight of water, and possibly small amounts of organic solvents, e.g., up to 15% by weight, preferably, up to 10% by weight based on the total coating composition. Organic solvent-based coating compositions contain, for example, 20 to 80% by weight of organic solvents based on the total coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methyl pyrrolidone and ketones, e.g., methyl ethyl ketone, acetone, cyclohexanone; aromatic or aliphatic hydrocarbons, for example, toluene, xylene, or straight-chain or branched aliphatic C6-C12-hydrocarbons.

The coating compositions, according to the invention, can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica and graphite effect pigments. Examples of fillers are silicon dioxide, barium sulphate, talcum, aluminium silicate and magnesium silicate.

The additives are additives usually used in the paint industry. Examples of such additives are light stabilizers, for example, based on benzotriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents and wetting agents. The additives are added in the usual amounts familiar to the person skilled in the art.

Pigments, fillers and additives generally used for paint may be used in one and/or both components of the two-component system.

Preferably the tin catalyst C) and the acid-functional compound D) are formulated together with the hydroxyl-functional binder A) in one component.

Either transparent or pigmented colored coating compositions can be produced. Therefore, the coating compositions according to the invention are suited for use as clear coats but can be pigmented with conventional pigments and used as pigmented topcoats, basecoats or undercoats such as sealer, primer or primer surfacer. They can be used to coat a substrate with a single coat or within a multilayer coating of substrates. Use as clear coat and colored pigmented topcoat is preferred, in particular in a multilayer coating.

Therefore, the present invention also relates to a process for coating substrates comprising the following steps:
I) applying the coating composition as defined above to an optionally pre-coated substrate, and
II) curing the applied coating composition by means of thermal energy.

The coating compositions are applied according to step I) of the process to an optionally pre-coated substrate.

Substrates can be any industrial goods to be coated with two-component polyurethane coating compositions. Preferred substrates are vehicle bodies and vehicle body parts.

The coating compositions may be applied by conventional application methods. Examples of application methods are brushing, roller application, knife coating, dipping and spraying. Spray application is preferred. After an optional flash-off phase, the coating layers may then be cured or the next coating layer is applied. Substrates which may be used are the various materials, e.g. used in industrial coating and vehicle construction, for example, metals, such as, iron, zinc, aluminium, magnesium, stainless steel or the alloys thereof or plastics, such as, polyurethanes, polycarbonates or polyolefines.

In step II) of the process the applied coating composition is cured by means of thermal energy. Exposure to thermal energy causes the thermally latent catalyst C) to be activated and to catalyze the curing of the coating composition.

According to a first preferred embodiment, the coating composition of the present invention and to be used in the above process is a clear coating composition which is applied onto a pigmented colour- and/or special effect-imparting base coat layer to produce a clear coat layer.

According to a second preferred embodiment, the coating composition of the present invention and to be used in the above process is a pigmented one-layer top coat composition which is applied onto a substrate coated with one or more coating layers, for example, with a primer and/or primer surfacer layer, to produce a pigmented top coat layer.

Accordingly the present invention is preferably directed to a process for coating substrates, comprising the following steps:
I) applying a top coat layer of colour- and/or special effect-imparting base coat composition and a transparent clear coat composition or of a pigmented one-layer top coat composition to an optionally pre-coated substrate, and
II) curing the top coat layer applied in step I) by means of thermal energy.

In step I) of the process a coating layer, preferably a top coat layer of a colour- and/or special effect-imparting base coat composition and a transparent clear coat composition or of a pigmented one-layer top coat composition is applied to an optionally pre-coated substrate. The colour- and/or special effect-imparting base coat composition contains colour pigments and/or effect pigments which are used to impart the final coating a desired colour and/or effect.

In step II) of the process the applied coating layer(s), preferably the top coat layer is then cured, wherein each layer may be cured separately after application thereof or two or more coating layers are applied one after the other without intermediate curing and are jointly cured. The applied coating layer is cured under those conditions that the thermally latent catalyst C) is activated and can catalyze the curing of the coating composition.

Preferably, the applied coating composition is cured for example, at temperatures of from 30 to 100° C., in particular from 30 to 80° C. Even if not preferred lower curing temperatures may also be used, but would lead to unacceptable curing times. The coating composition can, however, even be cured at higher temperatures of, for example, 80 to 160° C. or above.

The coating composition and the process, according to the invention, are suitable for automotive and industrial coatings. In the automotive coatings sector; the coatings and the process can be used for coating vehicle bodies and vehicle body parts in both vehicle production line painting and vehicle refinishing. They can also be used for coating large vehicles and transportation vehicles, such as, trucks, busses and railroad cars, where typically curing temperatures of up to 80-100° C. are used. Most preferred the coating compositions and the process can be used in vehicle and vehicle part refinishing. For refinishing, curing temperatures of, for example, 30° C. to 80° C., in particular, 40 to 60° C. are used. Furthermore, the coating compositions and the process can be used for coating any industrial goods other than motor vehicles.

The coating compositions in the form of a colored pigmented topcoat can be applied, for example, to normal one-component or two-component filler layers. However, the coating compositions according to the invention can also be applied and cured as a filler layer, for example, on normal one- or two-component primers, for example, two-component amine/epoxide primers or on electro-deposition primers.

The coating compositions in the form of transparent clear coats can be applied, for example, using the wet-in-wet process on solvent-based or aqueous color and/or effect-giving basecoat layers. In this case, the color and/or effect-giving basecoat layer is applied to a substrate, pre-coated if necessary, in particular, to pre-coated vehicle bodies or parts thereof, prior to the application of the clear coat layer. Following a flash-off period, if allowed for, both layers are cured together. For refinishing drying can take place, for example, at 30 to 80° C. for 15 to 45 minutes.

The use of the specific tin catalyst C) in combination with the acid-functional binder A) and/or the acid-functional compound D) offers a high curing rate, while providing the coating composition with a sufficient pot life. Also, the coating compositions can be formulated as low VOC compositions, having for example VOC values of 420 g/l or less. The coating compositions dry and cure in relatively short times to dust-free and hard coatings with very good appearance.

The invention will be further described by reference to the following Examples. All parts and percentages are on a weight basis unless otherwise indicated.

EXAMPLES

Example 1

Preparation

Preparation of (Meth)acrylic Copolymer A with Acid Number <5

A four liter three-necked glass flask equipped with an agitator, contact thermometer, dropping funnel and condensor was charged with 480 grams of Solvesso 100 (mixture of aromatic hydrocarbons, onset boiling point 164° C., Exxon) and 336 grams of Cardura® E10P (Hexion) and heated to reflux at about 170-175° C. A monomer/initiator mixture consisting of 720 grams styrene, 720 grams isobornyl methacrylate, 528 grams of 2-hydroxyethyl methacrylate, 96 grams of acrylic acid, 40 grams of di-tertiary-butylperoxide and 240 grams of Solvesso 100 were added continuously from the dropping funnel over 5 hours to the reactor contents. The dropping funnel was rinced with 40 grams Solvesso 100 and the mixture refluxed till constant viscosity. The reactor contents were then diluted with 800 grams of methyl amyl ketone.

The solids content of the resulting copolymer solution was about 60%, the hydroxyl number was 126 mg KOH/g binder solids and the acid number was below 5 mg KOH/g binder solids.

Preparation of (Meth)acrylic Copolymer B with Acid Number >5

A four liter three-necked glass flask equipped with an agitator, contact thermometer, dropping funnel and condensor was charged with 480 grams of Solvesso 100 (mixture of aromatic hydrocarbons, onset boiling point 164° C., Exxon) and 309.6 grams of Cardura® E10P (Hexion) and heated to reflux at about 170-175° C. A monomer/initiator mixture consisting of 708 grams styrene, 708 grams isobornyl methacrylate, 516 grams of 2-hydroxyethyl methacrylate, 158.4 grams of acrylic acid, 60 grams of di-tertiary-butylperoxide and 240 grams of Solvesso 100 were added continuously from the dropping funnel over 5 hours to the reactor contents. The dropping funnel was rinced with 40 grams Solvesso 100 and the mixture refluxed till constant viscosity. The reactor contents were then diluted with 780 grams of methyl amyl ketone.

The solids content of the resulting copolymer solution was about 60%, the hydroxyl number was 127 mg KOH/g binder solids and the acid number was about 23 mg KOH/g binder solids.

Preparation of a Hydroxyl-functional Polyester

According to Example 8 of U.S. Pat. No. 6,277,497 an oligoester was prepared as follows:

136 grams of MPE (mono pentaerythritol) were refluxed with 504 grams of methyl hexahydrophtalic anhydride for about one hour in 175 grams of BuAc (n-Butylacetate). Then 480 grams of glycidyl pivalate were added and the mixture was refluxed until the acid value was below 1 mg KOH/g binder solids. BuAc was added until a theoretical overall solids content of 75% was achieved. The hydroxyl number was 201 mg KOH/g binder solids.

Preparation of the Catalyst Dibutyldibenzyl Tin (DBD-BzSn)

In a round-bottom two-necked flask equipped with a condenser and a dropping funnel, 31.25 mmol (9.5 g) of dibutyltindichloride were dissolved in 25 ml of tetrahydrofurane (THF). Then 125.1 mmol (8.18 g) of zinc (zinc granules: −30+100 mesh, Sigma-Aldrich) and 50 ml of water saturated with $NH_4Cl$ were added. With vigorous stirring 125.1 mmol (21.4 g) of benzylbromide (in 1:1 stoichometric ratio with respect to zinc) were added drop wise at a rate sufficient to keep temperature below 27° C. The reaction flask was cooled down with ice. First a brown benzyldibutyltin chloride was formed as an intermediate. The addition took about 30 min. The resulting heterogeneous colorless mixture was stirred for a further 60-120 min to complete disappearance of Zn powder. The organic layer was separated, washed with saturated aqueous NaCl and dried over $MgSO_4$. Solvent was removed by distillation under reduced pressure up to 45° C. for 5 hours. An oil like liquid remained, which was distilled under vacuum to afford the pure compound.

Example 2

Preparation of Clear Coats

The ingredients according to Table 1, based on (meth) acrylic copolymer A with acid number <5, were mixed together to form clear coat compositions according to the invention (CC 1 and CC 2) and comparative clear coat compositions (comp. CC 1 to 6). Comp. CC 1 and 3 and comp. CC 5 and 6 contained essentially no acid groups in the binder and no separate acid.

The ingredients according to Table 2, based on (meth) acrylic copolymer B with acid number >5, were mixed together to form clear coat compositions according to the invention (CC 3 to CC 6) and comparative clear coat compositions (comp CC 7-10). Comp. CC 7 and 9 and CC 3 and 5 contained only acid groups in the binder and no separate acid.

In the comparative clear coat compositions 1 to 4 and 7 to 10, the catalyst DBDBzSn has been substituted for the standard catalyst DBTDL on a molar basis.

100 parts of each clearcoat formulation were blended, by hand mixing, with 36.6 parts of a polyisocyanate curing agent (3:1 by volume ratio). The polyisocyanate curing agent has been formed by mixing 6.11 parts propyleneglycol methyletheracetate, 6.11 parts butylglycolacetate, 3.43 parts xylene, 6.12 parts ethyl-3-ethoxy propionate and 78.23 parts Desmodur®N3390 (1,6-hexamethylenediisocyanate trimer, 90% solids in butylacetate/solvent nafta, Bayer). The resulting compositions had viscosities of about 19-22 seconds ready to spray (DIN EN ISO 2431 DIN 4 cup, 20° C.), a solids content of about 77% by weight and a VOC content of about 3.5 lbs/gal (420 g/l).

Application of Clear Coats

The clearcoats were sprayed over water-borne basecoats (Standohyd® Subaru blue ridge H95, Standox GmbH) on steel panels that were pre-coated with a commercial primer-surfacer. The basecoat layers have been flashed off for 45 minutes at room temperature before application of the clearcoats. The clear coats were applied at 45% RH/22° C., via 1.5 cross coat with a Devilbiss RP spray gun (GTI-S-110), nozzle 1.2, with gravity feed, in a resulting dry film thickness of 50-65 micron. After application of the clearcoats, there was a 5 minutes flash off time and the coatings were baked during 30 minutes at 60° C.

TABLE 1

Use of (meth)acrylic copolymer A (amount of ingredients in parts by weight)

| | comp. CC1 | comp. CC2 | comp. CC3 | comp. CC4 | comp CC5 | CC1 | comp. CC6 | CC2 |
|---|---|---|---|---|---|---|---|---|
| Acid number of composition | <3 | 23 | <3 | 23 | <3 | 23 | <3 | 23 |
| MAK | 21.35 | 20.07 | 20.85 | 19.57 | 21.4 | 20.12 | 20.9 | 19.62 |
| Byk361 | 0.35 | 0.35 | 0.35 | 0.35 | 0.35 | 0.35 | 0.35 | 0.35 |
| Byk306 | 0.15 | 0.15 | 0.15 | 0.15 | 0.15 | 0.15 | 0.15 | 0.15 |
| Tinuvin 292 | 0.41 | 0.41 | 0.41 | 0.41 | 0.41 | 0.41 | 0.41 | 0.41 |
| Tinuvin 1130 | 0.82 | 0.82 | 0.82 | 0.82 | 0.82 | 0.82 | 0.82 | 0.82 |
| 10% DBTDL in BuAc | 0.25 | 0.25 | 0.25 | 0.25 | | | | |
| 10% DBDBzSn in MAK | | | | | 0.2 | 0.2 | 0.2 | 0.2 |
| 20% DABCO in propylene glycol methylether | | | 0.5 | 0.5 | | | 0.5 | 0.5 |
| 50% Acetic Acid in BuAC | | 1.28 | | 1.28 | | 1.28 | | 1.28 |
| Acrylic Copolymer A | 50 | 50 | 50 | 50 | 50 | 50 | 50 | 50 |
| Polyester | 26.67 | 26.67 | 26.67 | 26.67 | 26.67 | 26.67 | 26.67 | 26.67 |

TABLE 2

Use of (meth)acrylic copolymer B (amount of ingredients in parts by weight)

| | comp. CC7 | comp. CC8 | comp. CC9 | comp. CC10 | CC3 | CC4 | CC5 | CC6 |
|---|---|---|---|---|---|---|---|---|
| Acid number of composition | 24 | 35 | 24 | 35 | 24 | 35 | 24 | 35 |
| MAK | 19.18 | 17.9 | 18.68 | 17.4 | 19.23 | 17.95 | 18.73 | 17.45 |
| Byk361 | 0.35 | 0.35 | 0.35 | 0.35 | 0.35 | 0.35 | 0.35 | 0.35 |
| Byk306 | 0.15 | 0.15 | 0.15 | 0.15 | 0.15 | 0.15 | 0.15 | 0.15 |
| Tinuvin 292 | 0.41 | 0.41 | 0.41 | 0.41 | 0.41 | 0.41 | 0.41 | 0.41 |
| Tinuvin 1130 | 0.82 | 0.82 | 0.82 | 0.82 | 0.82 | 0.82 | 0.82 | 0.82 |
| 10% DBTDL in BuAc | 0.25 | 0.25 | 0.25 | 0.25 | | | | |
| 10% DBDBzSn in MAK | | | | | 0.2 | 0.2 | 0.2 | 02 |
| 20% DABCO in propylene glycol methylether | | | 0.5 | 0.5 | | | 0.5 | 0.5 |
| 50% Acetic Acid in BuAC | | 1.28 | | 1.28 | | 1.28 | | 1.28 |

TABLE 2-continued

Use of (meth)acrylic copolymer B (amount of ingredients in parts by weight)

|  | comp. CC7 | comp. CC8 | comp. CC9 | comp. CC10 | CC3 | CC4 | CC5 | CC6 |
|---|---|---|---|---|---|---|---|---|
| Acrylic Copolymer B | 52.17 | 52.17 | 52.17 | 52.17 | 52.17 | 52.17 | 52.17 | 52.17 |
| Polyester | 26.67 | 26.67 | 26.67 | 26.67 | 26.67 | 26.67 | 26.67 | 26.67 |

Byk361: levelling additive from Byk Chemie.
Byk306: silicone surface additive from Byk Chemie.
Tinuvin 292: hindered amine light stabilizer from Ciba Speciality Chemicals.
Tinuvin 1130: liquid UV absorber (benzotriazole type) from Ciba Speciality Chemicals
DBTDL: dibutyl tindilaurate from AKCROS Chemicals (Tinstab BL277).
DABCO: 1,4-diazobicyclo[2.2.2]octane from Air Products
DBDBzSn = dibutyldibenzyl tin 50% Acetic acid solution in butylacetate, from Brenntag
MAK: Methyl amyl ketone = 2-heptanone (from Eastman)
BuAc: Butylacetate Acid number of composition: in mg KOH/g solids (solids is based on the binder solids of the binder mixture (acrylic copolymer and polyester) and the acetic acid) RH=relative humidity The results achieved are shown in Table 3 (use of (meth)acrylic copolymer A) and Table 4 (use of (meth)acrylic copolymer B).

TABLE 3

(use of (meth)acrylic copolymer A):

|  | comp. CC1 | comp. CC2 | comp. CC3 | comp. CC4 | comp. CC5 | CC1 | comp. CC6 | CC2 |
|---|---|---|---|---|---|---|---|---|
| Spray viscosity | 19 | 19 | 19 | 19 | 19 | 19 | 19 | 19 |
| Pot life | 40' | 3 h | 35' | 2 h | 5 h 40' | 8 h | 3 h 35' | 5 h |
| Dry film thickness CC (micron) | 60 | 60 | 60 | 60 | 55 | 55 | 55 | 55 |
| dust free time | imm. | imm. | imm. | imm. | 7' | 4' | 6' | imm. |
| gloss 20°, same day | 90 | 89 | 90 | 89 | 88 | 88 | 88 | 89 |
| DOI, same day | 89 | 88 | 88 | 86 | 96 | 96 | 96 | 96 |
| dullness, same day | 5 | 6 | 7.1 | 8.6 | 1.1 | 1.1 | 1 | 1 |
| Persoz hardness after 1 h | 94 | 62 | 108 | 82 | 19 | 34 | 38 | 43 |
| Persoz hardness after 1 day | 187 | 213 | 229 | 241 | 93 | 166 | 244 | 257 |
| Persoz hardness after 1 week | 312 | 322 | 322 | 322 | 305 | 355 | 368 | 369 |

TABLE 4

(use of (meth)acrylic copolymer B):

|  | comp. CC7 | comp. CC8 | comp. CC9 | comp. CC10 | CC3 | CC4 | CC5 | CC6 |
|---|---|---|---|---|---|---|---|---|
| Spray viscosity | 21 | 21 | 21 | 21 | 20 | 21 | 21 | 21 |
| Pot life | 2 h 05' | 2 h 10' | 2 h | 2 h 05' | 6 h 30' | 4 h 55' | 5 h 15' | 3 h 45' |
| Dry film thickness CC (micron) | 55 | 50 | 50 | 55 | 55 | 50 | 50 | 55 |
| dust free time | imm. | imm. | imm. | imm. | 2' | 1'30" | 1'30" | imm. |
| gloss 20°, same day | 89 | 89 | 89 | 89 | 89 | 89 | 89 | 89 |
| DOI, same day | 95 | 95 | 96 | 95 | 97 | 96 | 96 | 96 |
| dullness, same day | 1 | 2 | 1 | 1 | 1 | 1 | 1 | 1.7 |
| Persoz hardness after 1 h | 33 | 42 | 39 | 42 | 35 | 34 | 36 | 39 |
| Persoz hardness after 1 day | 148 | 185 | 184 | 192 | 143 | 162 | 211 | 215 |
| Persoz hardness after 1 week | 343 | 353 | 361 | 347 | 378 | 373 | 367 | 381 | imm. = immediately

The use of tin catalyst DBDBzSn in combination with acrylic copolymer B (with acid number >5 and/or with acetic acid (CC 1-6) led to remarkable longer potlife than using DBTDL, used at the same molar amount, in combination with the copolymer and/or acetic acid (comp CC 1-4 and 7-10).

The presence of acid groups is required for having acceptable drying properties, Increasing the acid number of the composition with DBDBzSn from <3 mg KOH/g to 23 to 35 mg KOH/g (CC1 and CC 2 versus comp. CC 5 and comp. CC 6) reduces the tack free time of the coating (physical curing of the coating) and improves initial hardness and hardness development.

Overall, using DBDBzSn in combination with acrylic copolymer B (with acid number >5) and/or with acetic acid into a clear coat formulation gives an excellent balance of long potlife, good drying and good hardness development with an excellent appearance.

Test Methods:

Viscosity: Spray Viscosity, of activated clear coat, measured in seconds according to DIN EN ISO 2431 DIN 4 cup, 20° C.

Potlife: the potlife of the compositions was measured by measuring the viscosity increase as a function of time Potlife=time within which initial viscosity has increased to initial viscosity×1.5. The potlife defines the period during which the clear coat is still easy to spray.

Dry film thickness: equipment used is from "Braive Instruments" (Belgium). Accurancy: 0.0001 mm Dust free time (in minutes): the point in the drying process when a plush of cotton fibres can be rubbed over or nudged on the film without leaving one of the fibres on the paint surface.

Gloss: measured with the micro-TRI-gloss from BYK Gardner (Germany). The reflected light is measured at 20°.

Dullness: measured with a Wave-scan DOI apparatus from BYK Gardner, Germany. Structures smaller than 0.1 mm influence visual perception and therefore, the wave-scan DOI measures with a CCD camera the diffused light caused by these fine structures. The parameter measured in this way is referred to as the "dullness" of the coating. A low value for dullness is preferred, with 1 as minimum.

Distinctness of Image (DOI): measured with a Wave-scan-DOI apparatus from BYK. Gardner, Germany. The DOI of a clear coat can also be described in terms such as brilliance, sharpness or clarity. The more distinct the reflection of an object on the surface, the more brilliant the coating film will appear. A high value is requested with a maximum of 100.

Persoz hardness: The change in film hardness of the coating was measured with respect to time by using a Persoz hardness tester supplied by Braive Instruments (Belgium). The number of oscillations (referred to as Persoz number) was recorded. The clear coat is applied on a glass panel, baked 30' at 60° C. and the hardness is measured on a regularly bases at 50-micron dry film thickness.

The invention claimed is:

1. Two-component coating composition, comprising
A) at least one hydroxyl-functional binder,
B) at least one polyisocyanate curing agent with free isocyanate groups,
C) at least one thermally latent tetrahydrocarbyl tin catalyst of general formula (I)

$$R_nR'_{4-n}Sn \qquad (I)$$

wherein R is an alkyl or cycloalkyl group, R' is an aryl, arylalkyl or alkenyl group and n is 1, 2 or 3, and
D) optionally at least one acid-functional compound, that is different from component A),
with the proviso, that a composition consisting of the at least one binder A) and optionally of the at least one acid-functional compound D) has an acid number of at least 5 mg KOH/g solids, and
wherein the coating composition is free of sensitizers and photoinitiators.

2. The coating composition of claim 1, wherein the at least one hydroxyl-functional binder A) has an acid number of 5 to 80 mg KOH/g binder solids.

3. The coating composition of claim 1, wherein the composition consisting of the at least one binder A) and optionally of the at least one acid-functional compound D) has an acid number of at least 10 mg KOH/g solids.

4. The coating composition of claim 3, wherein the composition consisting of the at least one binder A) and optionally of the at least one acid-functional compound D) has an acid number of 15 to 60 mg KOH/g solids.

5. The coating composition of claim 1, wherein n is 2 and the two residues R are the same and the two residues R' are the same.

6. The coating composition of claim 1, wherein R is a C1-C12 alkyl group.

7. The coating composition of claim 1, wherein R' is a group selected from a group consisting of phenyl, substituted phenyl, benzyl, substituted benzyl, vinyl and allyl group, and combinations thereof.

8. The coating composition of claim 7, wherein R' is a benzyl group.

9. The coating composition of claim 1, wherein catalyst C) is dibutyl dibenzyl tin.

10. The coating composition of claim 1, wherein the at least one binder A) and component D) comprise acid groups, and wherein the acid groups are carboxylic acid groups.

11. The coating composition of claim 1, wherein component D) is a carboxylic acid.

12. The coating composition of claim 1, comprising at least one hydroxyl-functional binder A) with an acid number of 5 to 60 mg KOH/g binder solids and at least one carboxyl-functional compound D), wherein the at least one carboxyl-functional compound D) is a carboxylic acid.

13. The coating composition of claim 1, wherein the coating composition is a clear coat composition or a pigmented colored topcoat composition.

14. Process for coating substrates comprising the steps:
I) applying a coating composition of claim 1 to an optionally pre-coated substrate, and
II) curing the applied coating composition by means of thermal energy.

15. The process of claim 14, wherein the applied coating composition is cured at temperatures of from 30° C. to 100° C.

16. The process of claim 14, wherein it is a process for vehicle refinishing.

* * * * *